Figure 1:
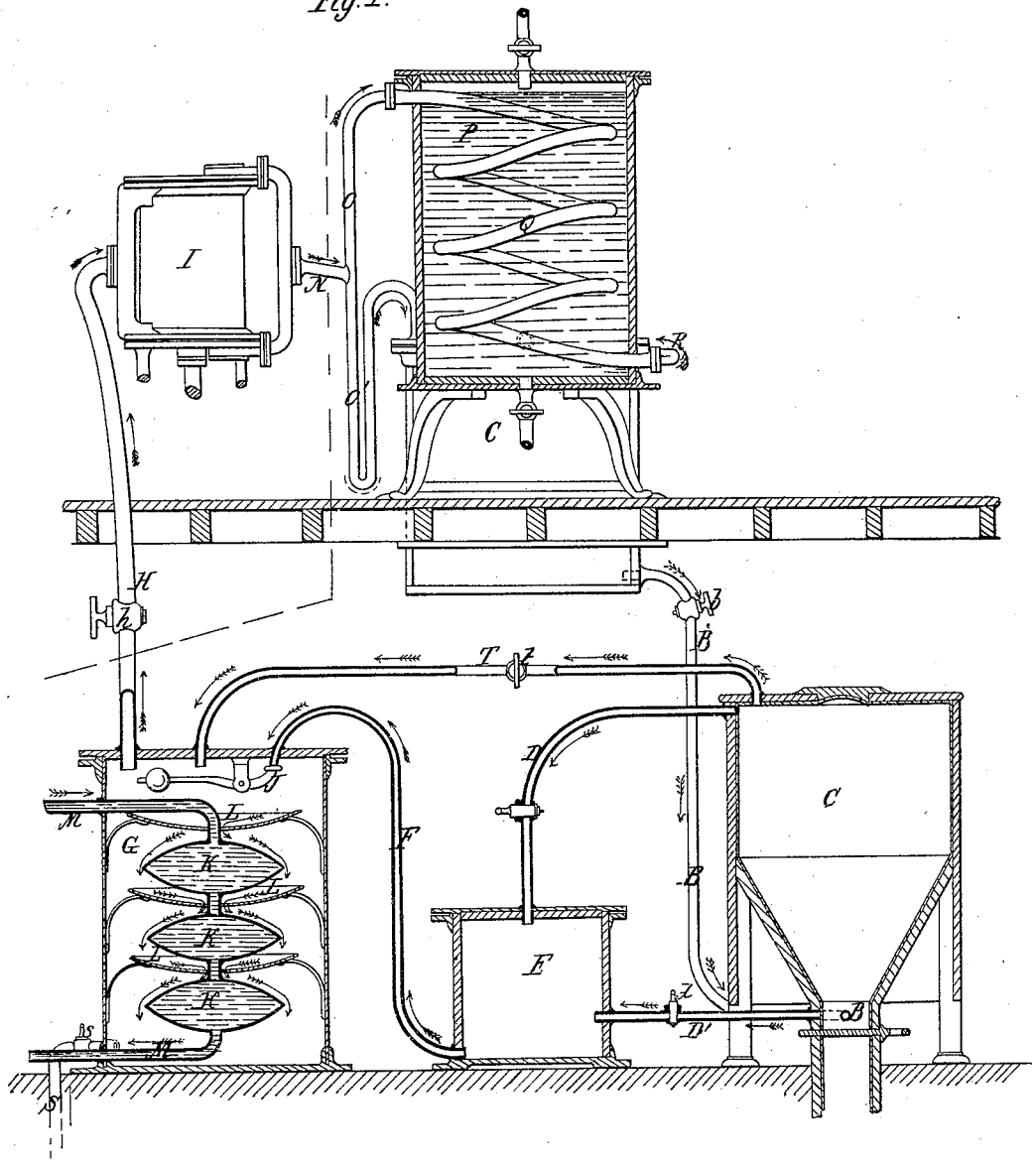

Sheet 1, 2 Sheets.

Sim & Hutchinson.
App's for Extracting Oil from Vegetables &c.

Nº 88,222. Patented Mar. 23, 1869.

Witnesses:
J. Scheiblin
Jno S Slater

Inventors:
Thos Sim
E S Hutchinson
By Knight Bros atty

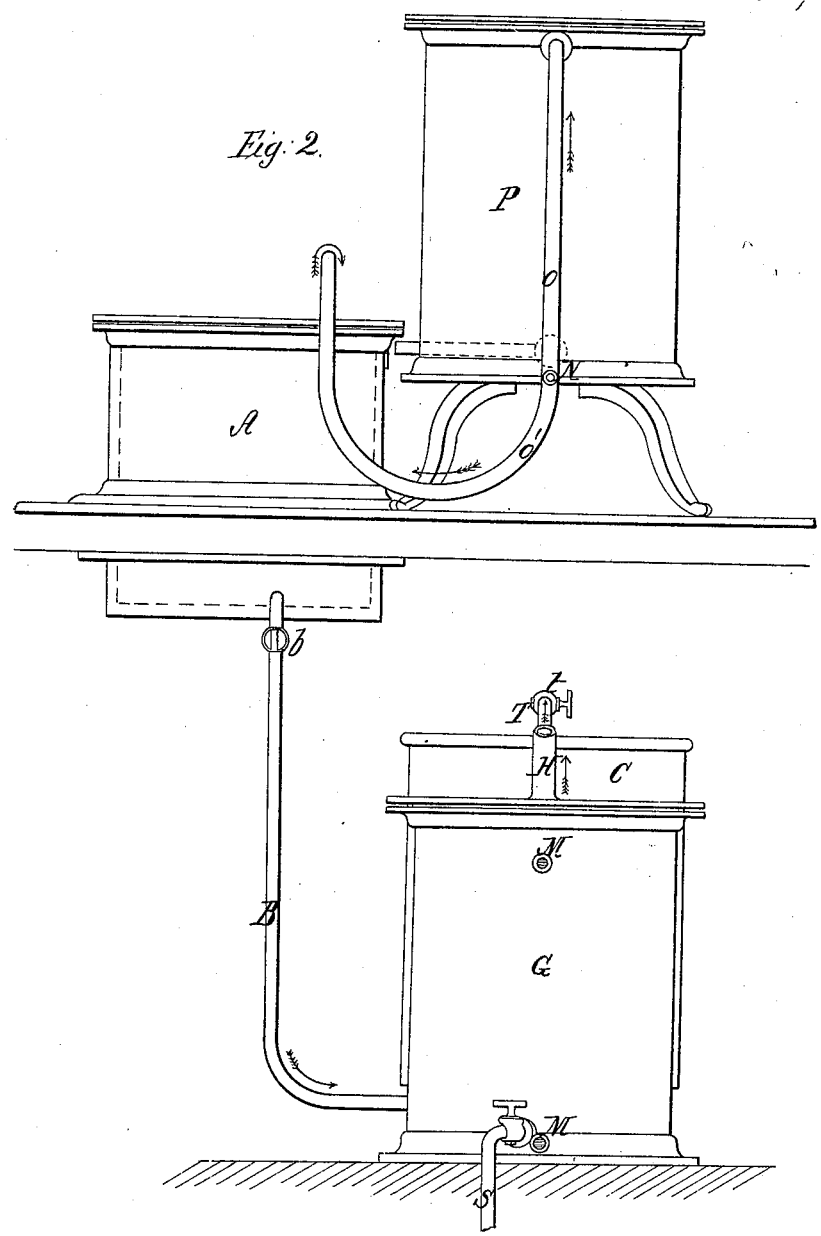

UNITED STATES PATENT OFFICE.

THOMAS SIM AND ELIAS S. HUTCHINSON, OF BALTIMORE, MARYLAND.

IMPROVED APPARATUS AND PROCESS FOR EXTRACTING OIL FROM VEGETABLE AND OTHER MATTER.

Specification forming part of Letters Patent No. 88,222, dated March 23, 1869.

*To all whom it may concern:*

Be it known that we, THOMAS SIM and ELIAS S. HUTCHINSON, both of Baltimore, Maryland, have invented a new and useful Process and Apparatus for Extracting Oil from Vegetable and other Matter; and we declare the following to be a sufficiently full and exact description of the same to enable one skilled in the art to which our invention appertains to carry it into effect, reference being had to the accompanying drawing, making part of this specification.

Our process consists in separating oil from corn-meal, cotton-seed, or any other matter containing oil, by means of bisulphide of carbon or other suitable chemical, and subsequently removing the chemical from the oil by the aid of an exhaust, sufficient heat being applied to prevent undue cooling of the material by the evaporating process, but not such a degree of heat as to endanger discoloration of or injury to the oil.

In carrying out our invention we employ an apparatus consisting of a reservoir, A, containing the bisulphide, and provided with a pipe, B, to conduct it to the lower part of a vat, C, which may contain five tons (more or less) of ground grain, cotton-seed, or any other material from which the oil is to be extracted. The bisulphide rising within the vat, and permeating the mass of material therein, completely carries away the oil, which, mingling with the bisulphide, flows over through the pipe D into a tank, E, from whence the combined liquid is carried, by atmospheric pressure, through a pipe, F, into a separate chamber, G, from which the air is partially exhausted through a pipe, H, by an air-pump, I. A weighted valve, J, is applied to the discharge-orifice of the pipe F, in order that a partial vacuum may be maintained within the chamber G. The combined oil and bisulphide entering the chamber G flows over the surfaces of a connected series of warm-water chambers, K, between which are interposed annular pans L, so that the liquid dropping from the periphery of each of the chambers K will be caught by the pan below, and by it conducted to the center, where it descends onto the surface of the water-chamber next below, to again flow to the outside, as before.

The object of this arrangement is to expose to the atmosphere the largest possible surface of the liquid. To prevent the liquid cooling under evaporation, warm water is circulated through the chambers K by pipes M. At a temperature of 40°, or slightly more, the bisulphide will be vaporized and exhausted very freely under the action of the air-pump, and completely separated from the oil without the discoloration and injury which are caused to the oil by the customary process of separating bisulphide from it by distillation. The oil from which the bisulphide has been separated is conducted by a pipe, S, into a suitable well, from which it may be drawn for use. As soon as the bisulphide comes over into the tank E without oil, indicating that the oil has all been extracted from the meal or other material within the vat C, the supply of bisulphide is shut off by means of the cock $b$. The cock $d'$ is then opened, and the bisulphide allowed to drain out of the vat C as completely as it will. The cock $t$ is then opened, and, by the continued action of the air-pump I all the bisulphide remaining in the vat is drawn through the pipe T, in the form of vapor, leaving the meal within the vat in a perfectly dry state.

The gaseous bisulphide which is drawn by the air-pump I from the separating-chamber G is driven through the pipes O P Q, the latter being a worm of common form, surrounded by cold water within a chamber, in order to condense the gas. From the condenser the bisulphide is conducted, in liquid form, to the reservoir A for future use.

Any of the bisulphide which condenses within the pipes, by radiation of heat, before reaching the condensing-chamber P, is carried to the reservoir through an inverted siphon, O', which forms a trap to prevent any of the gas passing to the reservoir and escaping the condenser.

We have described our invention as applied to the use of bisulphide of carbon for separating the oil; but it is evident that various other chemicals may be used in the same way.

We claim as new and desire to secure by Letters Patent—

1. The process of separating bisulphide of carbon or other chemical from oil by the aid of an exhaust, substantially as herein described.

2. The apparatus constructed and arranged to operate substantially as herein set forth.

3. The combined process of extracting oil from vegetable matter by means of bisulphide of carbon or other suitable chemical, and afterward separating the chemical from the oil by the aid of an exhaust, substantially as herein described.

To the above specification of our invention we have signed our hands this 26th day of February, 1869.

THOS. SIM.
    ELIAS S. HUTCHINSON.

Witnesses:
  OCTAVIUS KNIGHT,
  W. B. DEMING.